Dec. 23, 1941.    W. J. DONOHUE    2,267,086
FILTERING METHOD AND APPARATUS
Filed July 22, 1937    6 Sheets-Sheet 1

Inventor:—
William J. Donohue,
By Frank J. Foley atty.

Dec. 23, 1941.  W. J. DONOHUE  2,267,086
FILTERING METHOD AND APPARATUS
Filed July 22, 1937  6 Sheets-Sheet 4

Inventor:-
William J. Donohue,
By Frank J. Foley Atty.

Dec. 23, 1941.  W. J. DONOHUE  2,267,086
FILTERING METHOD AND APPARATUS
Filed July 22, 1937  6 Sheets-Sheet 6

Inventor:—
William J. Donohue,
By Frank J. Foley, Atty.

Patented Dec. 23, 1941

2,267,086

UNITED STATES PATENT OFFICE 2,267,086

FILTERING METHOD AND APPARATUS

William J. Donohue, Chicago, Ill.

Application July 22, 1937, Serial No. 154,983

7 Claims. (Cl. 210—199)

This invention pertains to improved methods and apparatus for separating suspended solids from liquids.

This invention is of particular value in effecting the rapid separation of suspended solids of slow settling character from dilute liquid mixtures which otherwise would require long detention time were the separation to be accomplished by sedimentation. It is also of great utility in the separation of suspended solids from liquids where the solids are extremely fine and the mixture so dilute as to present a difficult filtering problem.

Another advantage of this invention lies in the fact that the separation is rapidly effected, thereby producing appreciable economies in space required and capital expenditure. Furthermore, by means of this invention one can produce sludges of lower moisture content than can possibly be obtained with sedimentation apparatus, this feature alone accomplishing operating savings of appreciable amount in many instances.

Where certain solutions containing suspended solids have heretofore been separated by a combination of settling and filtering, this invention accomplishes the separation in a single apparatus requiring only a fraction of the space formerly throught required.

Also, where heretofore it has been necessary to suspend entirely the operation of filters when they were being repaired and renewed, this invention makes it possible to conduct a continuous filtering process uninterruptedly for an indefinite period of time, filter repairs and replacements being made without interference with the process.

This invention, additionally, provides improvements in the washing of solids to free them from adhering liquids.

Other objects and advantages of the invention will become apparent from a perusal of the claims, drawings and specification wherein I have described and illustrated some of the methods and apparatus.

Figure 1:
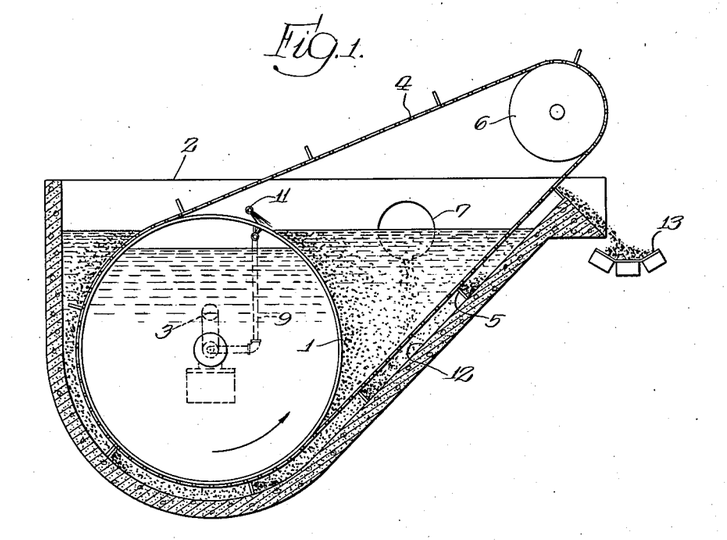
Fig. 1 is a central sectional view of one embodiment of the invention.
Figures 2, 3:
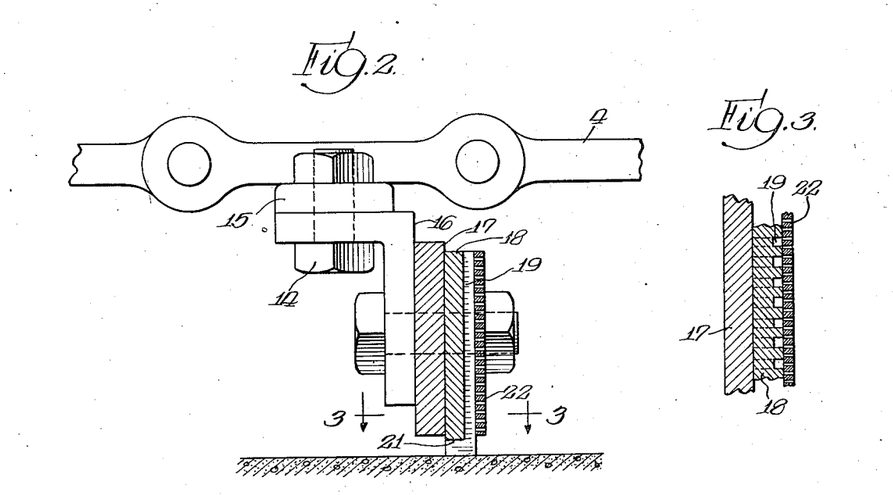
Fig. 2 is an enlarged detail view of a preferred form of scraper used in the invention.
Fig. 3 is a sectional view on the line 3—3 of Fig. 2.

Referring now to Figs. 1, 2 and 3, in this embodiment there is provided a cylindrical screen or filter I with closed ends mounted in any suitable manner in bearings at its opposite ends for rotation in a tank 2. Through one of the bearings, in any suitable manner common in this art, a passage may be provided communicating with a liquid draw-off pipe 3 which will conduct the filtered liquid to any suitable place of disposal.

The details of construction of the bearings and the draw-off pipe do not form a part of this invention.

The construction of the screen or filter itself may be varied to suit the particular separation problem encountered. An extremely fine screen of cloth or wire is not necessary, as one of coarser character will suffice, due to the fact that the filtering is principally accomplished through a deposited layer of the solids themselves, the screen serving principally as a support for the deposited layer, as in a sand filter wherein the sand serves as a supporting medium for the deposited solids which constitute the actual filter medium.

For the removal of solids from the chamber 2 there is provided a double continuous sprocket chain 4 carrying scrapers, diagrammatically indicated as 5, the chains encircling the rotating screen itself at each end and over sprockets indicated as 6.

Any suitable motive power may be employed to cause the rotation of the screen. Either a constant or variable speed drive may be used, but in any event the motion of the screen will be very slow to facilitate the gentle depositing of a thick but adequately porous filter layer. The movement of the screen and scrapers induces a gentle agitation of the liquid in the tank helpful in keeping the thickened solids in suspension, which is desirable.

The dilute mixture of liquid and suspended solids may be introduced through an inlet 7 located as shown, or at some other suitable point a substantial distance from the surface of the filter.

Solids retained on the screen form a filter bed which amply clarifies the liquid as the latter is drawn into the interior of the slowly rotating screen and evacuated therefrom by a slightly lower head. As explained below, the solids collected on the screen are discharged back into the liquid body and thereby raise the solids concentration to many times that of the original dilute mixture, with the result that agglomeration of the newly entering fine solids with the heavier masses already in the tank occurs. Thus before reaching the screen, the entering raw dilute liquid mixture undergoes an efficient preliminary thickening by admixture with the more highly concentrated mixture maintained within the tank.

During prolonged operation of the screen, the deposited layer of solids on the screen will naturally tend to accumulate to such a thickness as to decrease the rate of filtering. Hence, I provide means for removing some of the deposited layer. Preferably, this means takes the form of washing sprays located either on the exterior of the rotating screen or the interior, or both, and striking the screen either above or below the liquid level. I have indicated, more or less diagrammatically, the position which such sprays might take, the interior spray pipe 9 being fed through the bearings of the cylinder in any suitable and well known manner, while the outer washing sprays 11 may be connected with a water supply in any desired manner. Preferably, the liquid used to spray the screen to wash the solids therefrom will be clarified liquid which has passed through the screen, although some other source of supply may be employed if desired.

Also it is contemplated that air, steam, chemical, or other liquid mixture jets may be used on the interior or exterior of the screen in place of the water or in addition thereto, and that scrapers and other mechanical devices also may be used. In any event, it is my aim to remove continuously or intermittently a portion or all of the layer of solids in an efficient manner, avoiding projecting any of the solids forcibly through the screen to the interior. After the screen is cleaned or partially cleaned by the sprays, it is quickly coated again to an efficient filtering depth by the thickened mixture adjacent the cylinder. The solids removed from the screen surface fall back into the tank 2 to aid in the increase or maintenance of solids concentration generally throughout the tank.

As the ends of the screen are imperforate and spaced a short distance from the side walls of the tank, there will be freedom of movement of the concentrated mixture all around the screen, tending toward equalization throughout the tank depth of the degree of concentration.

The structure shown in Fig. 1 is excellently suited for the handling of solutions containing high gravity solids such as fine sand or other mineral matter, and in the course of its operation a natural classification of the mixture in the tank 2 is continuously taking place, the heaviest part of the solution sinking toward the bottom, from which location a portion of it is continuously being removed by the scraping mechanism.

Due to the continuous rotation of the screen and the movement of the scrapers 5, a concentrated mixture of the liquid and solids is carried by the scrapers 5 up along the inclined wall 12 and delivered eventually to the exterior of the tank to be carried to any suitable place of use or disposal. I have indicated that a carrier belt 13 may be used, if desired, to carry away the discharged solids.

The relative proportions of liquid and solids removed by the scrapers will, of course, depend upon the particular operation and, where the solids drain readily, I propose to use a draining type of scraper such as is shown in Fig. 2.

This self-draining scraper may be secured by means of a bolt 14 to a lug 15 carried by the chain 4 and, in the preferred form of construction, includes an angle iron 16 to which is secured, in any suitable manner, a plate 17 on which is clamped a scraper blade 18 having vertical channels 19 through which the excess water may drain downwardly and escape backwardly under the shoulder 21, a screen 22 of any suitable construction being imposed over the surface of this channeled member to retain the solids.

Figures 4, 5:
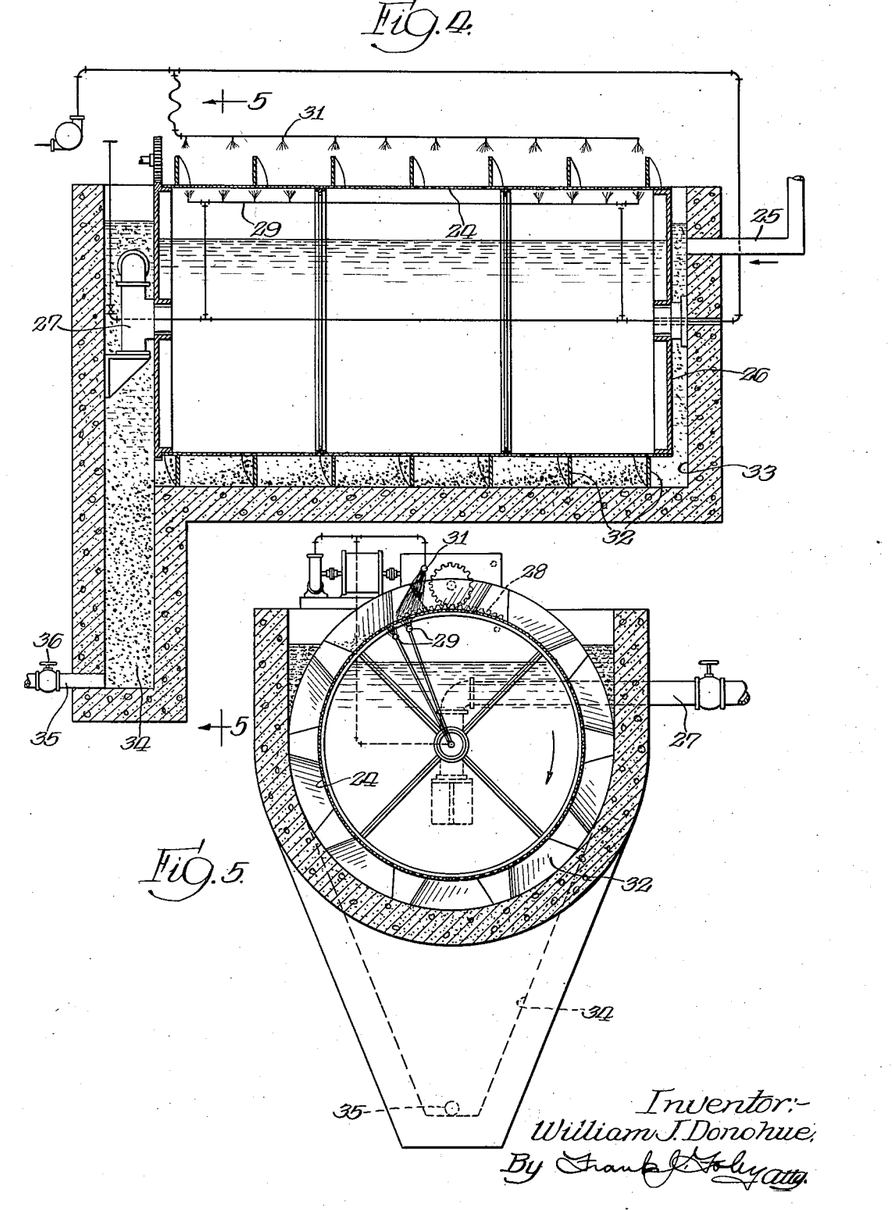
Fig. 4 is a longitudinal sectional view of another modification of the invention.
Fig. 5 is a sectional view on the line 5—5 of Fig. 4.

In the form of the invention shown in Figs. 4 and 5, a rotating screen 24 is employed mounted preferably as shown and the incoming dilute liquid is introduced through a channel 25 at one end of the screen toward the solid end wall 26. The liquid will then pass around the end of the screen and move through the more concentrated body of solids surrounding the screen and be drawn through the screen and deposited layer of solids thereon, preferably by a lower hydrostatic pressure on the interior of the screen. The filtered liquid will be withdrawn from the interior of the screen through a pipe 27 and evacuated to any desired point. As the screen is slowly rotated by means of power applied in any suitable manner to a ring gear 28, the deposited layer of solids may be dislodged from the surface of the screen, above or below the liquid level by a series of internal jets 29 or external jets 31, or both. Either air, liquid, or both, may be used on the interior of the screen and liquid preferably used on the exterior jets.

This form of the invention is the preferred type for the handling of solutions containing light or flocculent solids such as obtain in activated sludge, water treatment or sugar solutions.

The solids thus dislodged from the screen will fall back into the tank to increase or maintain the solids concentration therein to promote a more efficient filtering mixture and to aid in depositing a sufficiently dense layer of solids on the surface of the screen to act as the real filtering material. Meanwhile, any suitable arrangement of spirally constructed blades, such as 32, carried on the exterior of the rotating screen will gradually work the heavier bottom solids along the bottom of the chamber 33 into an end well 34 from which they may be evacuated through a pipe 35 controlled by the valve 36.

Figure 6:
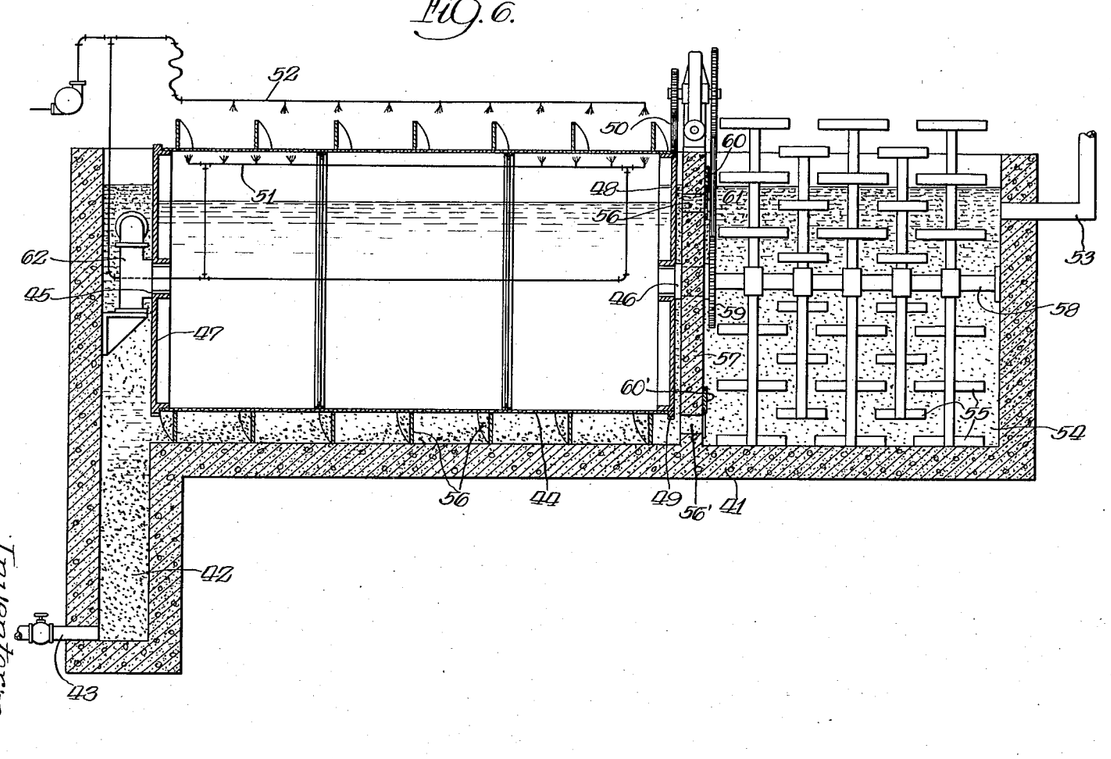
Fig. 6 is a longitudinal sectional view of another modification of the invention.

The form of the invention shown in Fig. 6 is similar to that shown in Figs. 4 and 5 except for the addition of an enlarged detention chamber where the feed inlet is located. The tank 41 has a well 42 at one end from which the concentrated solids may be drawn off through a pipe 43. A rotatable cylindrical screen 44 journaled at 45 and 46 is provided with imperforate end walls 47 and 48. The cylinder or screen is slowly rotated in any suitable manner, for example, by means of a ring gear 49 and chain 50.

A washing spray system 51 may be positioned on the interior of the screen and another washing system 52 disposed on the exterior of the screen for dislodging solids therefrom, for the purpose heretofore described.

A feed inlet 53 introduces the dilute liquid into a detention space, generally indicated as 54. It is contemplated that reagents, filtering aids, aeration, flocculating aids, etc., may be added to the inflowing liquid in cases where their addition is desirable and that the detention space will afford ample opportunity for the action of these added materials on both the dilute inflowing mixture and on the concentrated mixtures of accumulated solids and liquid.

In the detention chamber I provide a plurality of paddles such as 55 arranged in any suitable manner to provide a thorough and continuous agitation of the body of liquid so that the solids therein may be kept in uniform and complete suspension and may flow eventually in a uniform mixture through one or more apertures such as 56 and 56' which are disposed in the wall or bridge 57 in any desired number and in any desired locations. These apertures may be valve controlled in any suitable manner in order to regulate the backflow of solids from the filter chamber and to control the liquid level in the detention chamber. For illustrative purposes gate valves 60 and 60' are shown, the operating mechanism being omitted. The paddles or blades are supported on a shaft 58 which may be rotated in any suitable manner, as, for example, by means of a gear 59 and chain 61. Any suitable form of driving mechanism may be employed to cause the rotation of the screen 44 and the agitator shaft 58 and, in many instances, may be desirable to rotate the agitator more rapidly than the screen.

The detention chamber makes it possible to detain a large volume of the incoming liquid out of contact and apart from the rotating screen where the solids may be allowed to accumulate and become more concentrated. This accumulation is brought about at the time the apparatus is put into operation by flowing liquid into the apparatus and withdrawing it through the screen through the outlet pipe 62, preferably by having a lower head at the outlet and continuing the filtering of liquid without permitting any solids to be discharged through the sludge outlet 43. Meanwhile solids removed from the screen by the washing sprays are retained in the body of liquid and gradually the solids concentration will be increased and will extend back into the detention chamber until the desired concentration in that chamber has been attained. Then the sludge outlet valve 43 may be opened and regulated to maintain the desired concentration and the high level apertures such as 56 are opened and lower level apertures closed.

The thickened mixture in the detention chamber will act as a suspended filter through which the incoming dilute mixture must flow, causing the newly entering suspended solids to be entrapped by the larger masses suspended in the detention chamber. A further advantage of this detention is that it facilitates the purpose of depositing a thick layer of solids on the screen through which the liquid must eventually flow. Furthermore, whenever the detention chamber is used for coagulation, aeration or other conditioning purposes requiring definite detention time, the chamber is proportioned to the requirement and equipped with the necessary auxiliary equipment such as air piping, "filtros" plates or chemical feed piping, etc.

There are a number of instances in industry where the immediate problem is not to separate from a liquid a dilute suspension of solids, but rather to wash from a thickened mass of solids valuable adhering chemical solution. This problem is readily solved with the apparatus here described. The solids are introduced into the detention space and an amount of wash water large relatively to the weight of the solids present in the space may be caused to flow through these solids. The wash water carrying the recovered chemical with it in a diluted state will be clarified when passing through the filter, while solids depositing on the screen will be discharged back into the liquid body for further washing. The solids are kept in agitation in the detention space while the wash water is flowing therethrough. In order that this washing of solids may be done in a continuous process, solids are gradually progressed from the detention chamber along with the liquid into the filter chamber and eventually into the sump.

The liquid used in the jets 51 and 52 may be derived from any source, but is preferably clarified liquid which has already passed through the filter, although fresh water alone may be used. Furthermore, a multiplicity of spray wash lines either inside or outside the filter may be used in preference to the auxiliary detention chamber as indicated on Fig. 1. This washing arrangement is also suitable to the form shown on Figs. 4 and 5.

The capacity of the detention chamber is subject to great variation in order to meet any particular problem, the proportions shown above being merely suggestive. Many variations in the relative rate of discharge of clarified liquid or wash water and of thickened suspensions of solids may be made, and also the degree of thickening of the solids suspension may be varied.

Whenever filter aids or flocculating and chemical reagents are being added to the raw liquid to facilitate coagulation or filtering of suspended solids or to precipitate dissolved solids, the detention space will often be of great value in detaining the mixture the necessary time for treatment thereof. Among the various results of this detention will be better and more complete action of the materials added and, in some cases, a saving in the amount of material necessary to be added. Heretofore, in many instances where chemicals have been added, it has been found desirable to return a certain amount of the solids in order to obtain maximum utilization of the excess chemical normally necessary. By accumulating a dense concentration within the detention chamber better flocculation and an easily filterable solution is obtained and the necessity of returning once separated solids is obviated.

For example, where lime, alum, or other chemical is used in a water treatment system, it is given the necessary time to complete its action in this detention chamber where it will be kept suspended by adequate agitation and by the concentration of solids in a uniform manner and in position where the incoming dilute mixture must pass through the concentrated mixture and completely around the particles. Less chemical per gallon of water will, therefore, be required and more effective action and better clarification will be attained. Chemical reaction is greatly accelerated also.

Of course, these various filter aids and other materials may be introduced directly into the detention chamber instead of being mixed with the liquid prior to its entry.

Either or both spray systems may be located below the liquid level in any of the tanks described above, or below the liquid level in the interior of the screens, or either or both spray systems may strike the screen between the two liquid levels.

The blades mounted on the outside of the screens for advancing the solids are preferably not formed as continuous spirals but rather as mere short segments in spiral arrangement.

It is contemplated that any suitable screen material may be used, whether of cloth, metal or composition products suitable for that purpose.

Figure 7:
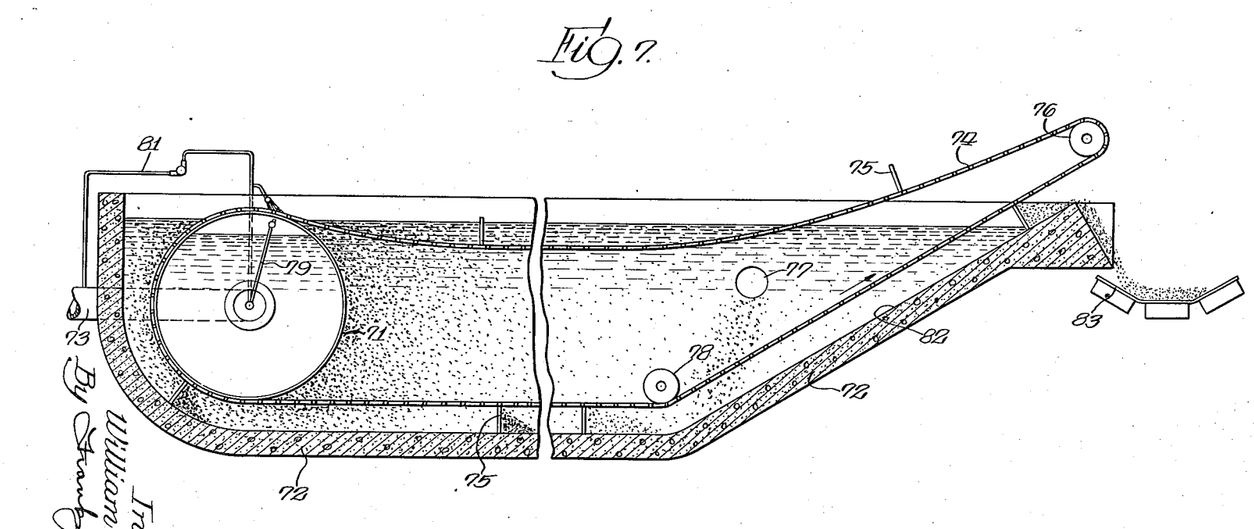
Fig. 7 is a longitudinal sectional view of a further modification of the invention.

A further modification of the invention is illustrated in Fig. 7 in which a cylindrical screen 71 is mounted, preferably similarly to the screen 1 of Fig. 1, rotatably in a tank 72, the filtrate being drawn off through an outlet pipe 73. Double chains 74 encircling the sprocketed ends of screen 71 and scrapers 75 similar to scrapers of Figs. 1 and 2, are driven by any suitable power through sprockets 76 to remove the solids from the chamber. In the operation of this device the dilute liquid containing the solids which are to be removed therefrom is introduced through an inlet such as 77 located as shown, or at some other suitable point remote from the screen or filter and preferably at the opposite end of the tank, being drawn toward the screen and depositing on the surface of the filter a layer of solids which thereupon acts as a filter bed. Due to the long travel between the inlet and the screen, the heavy solids will settle to the bottom of the chamber and accordingly the scraper blades 75 must be held in close contact with the bottom of the chamber to pick up these heavy solids. This may be accomplished by using idler sprockets such as 78 for directing the movement of the scrapers.

The lighter solids which deposit on the screen must, of course, not be allowed to accumulate to form too thick a filter bed, hence I employ some means to dislodge them from the filter bed, either intermittently or in a continuous manner. For this purpose an internal spray system is diagrammatically indicated at 79 and an external spray system, similar to that indicated as 11 in Fig. 1, may also be employed. The liquid used for this spray is preferably taken from the drawn off filtered liquid, as indicated by the pipe 81, although it may be derived from any other source.

As in the other forms of the invention, the solids dislodged from the surface of the screen will fall directly back into the body of liquid surrounding the screen to increase the solids concentration therein, aiding in the general object of depositing a thickened body of solids onto the screen surface and at the same time causing the liquid flowing toward the screen to pass through a heavy concentration of solids whereby the finer solids may have an opportunity to agglomerate with the heavy masses of solids suspended in the liquid.

Not only will the blades 75 discharge from the tank those solids which settle by reason of their own weight shortly after entry into the tank, but the thickened concentrations of solids occurring in the vicinity of the screen will gradually settle toward the bottom of the tank and be carried by the blades up the inclined surface 82 at the other end of the tank and be discharged, preferably onto a conveyor belt such as 83, or otherwise removed from the vicinity of the tank.

As will be understood by those skilled in this art, in some treatment problems heavy solids such as sand will drop rapidly to the bottoms of the chambers and will be removed by self draining scrapers along with other solids or thickened solutions. In other cases the solids progressed along the tank bottom by the scrapers will have a very high moisture content and will be too fluid to move up an inclined wall as illustrated in Fig. 7. In this case a sump or pocket extending well below the floor of the tank will take the place of the inclined wall and discharge of solids will be accomplished either by pump or gravity.

Figure 8:
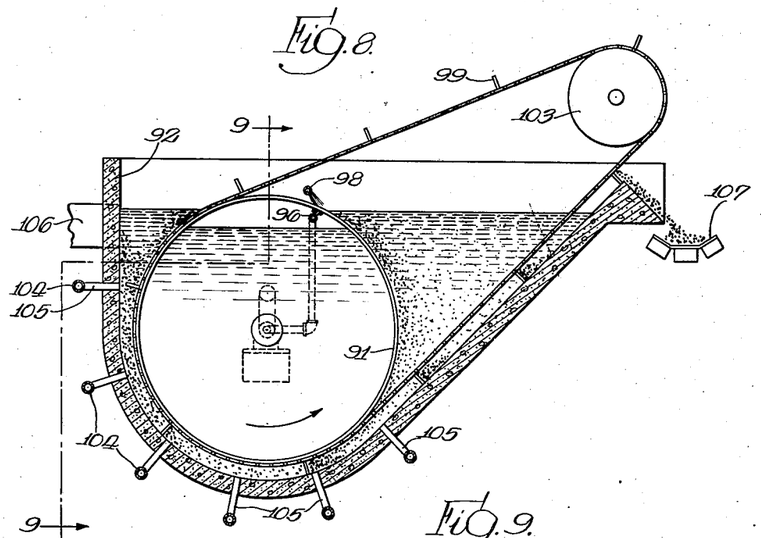
Fig. 8 is a sectional view of the apparatus equipped with washing facilities.
Figure 9:
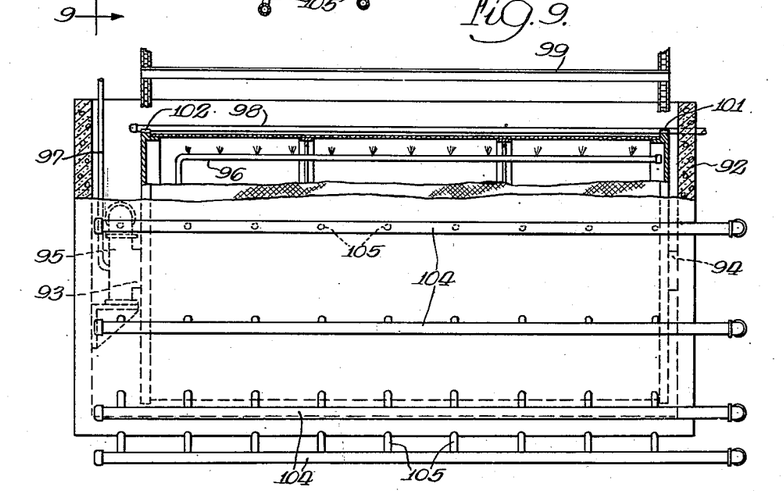
Fig. 9 is a sectional view on line 9—9 of Fig. 8.

Figures 8 and 9 show an apparatus having a cylindrical rotatable filter 91 provided with imperforate end walls spaced inwardly a short distance from the side walls of the tank 92, similarly to the rotatable filter shown in Figure 1. The opposite ends of the cylinder are supported in bearings 93 and 94 on the vertical side walls of the tank, and the filtrate is drawn off through the hollow bearing 93 by means of a pipe 95 to any suitable place of disposal by gravity or suction, as may be preferred.

An internal spray system indicated as 96 supplied through the bearing by a pipe 97 is employed as in Fig. 1 to assist in dislodging the deposited solids on the filter surface, while an outside spray system 98 aids in dislodging and washing the deposited solids back into the liquid surrounding the filter. A pair of chains provided with attached scraper blades 99 are carried on the sprockets 101 and 102 on the end walls of the cylinder and pass around a pair of sprocket wheels such as 103 by which they may be driven by any suitable motive power.

The device of Figures 8 and 9 differs from that of Fig. 1 in that it is provided with a plurality of pipes which furnish a washing fluid to the interior of the tank, the main purpose of this form of apparatus being to wash from the solids any adhering liquids such as a valuable chemical solution or other solution in order either that the solids may be recovered entirely free from the former adhering solution or that the solution itself being especially valuable may be recovered for other use. Consequently, I provide pipes such as 104 connected to any suitable source of supply of a washing fluid, for example, water, the pipes being spaced at intervals about the tank as shown, and each pipe having a plurality of short nozzles 105 extending therefrom through the tank wall into proximity with the cylinder, but not projecting far enough to interfere with the scrapers 99. Each of the horizontal supply pipes 104 may be controlled by valves (not shown) separately from the other horizontal feeder pipes so that the operator may supply wash liquid to all or any fractional number of the pipes. The total number of horizontally extending feed pipes and the total number of nozzles leading from each is susceptible of a great deal of variation, as will be determined in accordance with each particular washing problem.

A feed inlet 106 may be used to supply the solids which are to be washed, introducing them in a more or less diluted state into the tank, preferably, although they may be introduced in a more or less dry state.

The filter will ordinarily rotate slowly and the wash water and other liquid surrounding the filter will pass into the interior of the filter and be drawn off through the pipe 95. The solids deposited on the surface of the filter and those suspended in the liquid in its vicinity will be subjected to a succession of washings by the wash liquid supplied through the nozzles 105. The spray nozzles 96 and 98 will dislodge the deposited solids and discharge them back into the tank where they may be retained in such concentration as the operator may deem desirable. It is obvious that the concentration of solids in the tank may be varied by varying the relation between the amount of solids discharged by the scrapers onto the delivery belt 107 and the amount of solids being continuously introduced through the inlet pipe 106. A variation in the speed of rotation of the filter and a variation in the number of scrapers 99 are factors which will aid in such control. By means of this apparatus solids may be retained in the chamber a considerable length of time surrounding the filter, it being their natural tendency to maintain a rather uniform dispersion through the tank and while so suspended they may be subjected to as many successive washings as may be required to free them from the previously adhering liquids.

Referring now to Figures 10 to 13, inclusive, I have disclosed filtering apparatus which I find especially suitable for an operation in which continuous use of the apparatus is highly desirable or imperative. This apparatus and method may be used in washing solids or separating solids from liquids. Heretofore, it has always been necessary entirely to suspend the operation of a filter whenever the filter cloth was being replaced. Such shutdowns inevitably caused dislocations in the normal functioning of the processes in which the filters played a part, or required the provision of costly auxiliary or standby apparatus.

Figure 10:
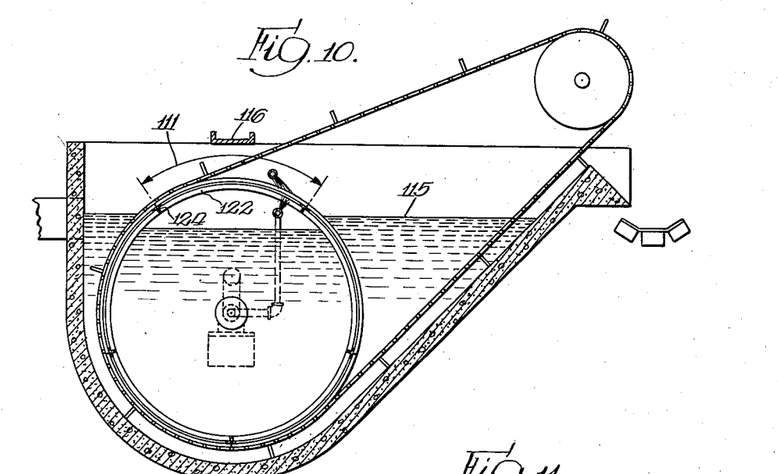
Fig. 10 is a central sectional view of one form of the apparatus wherein the filter has removable sections.
Figure 11:
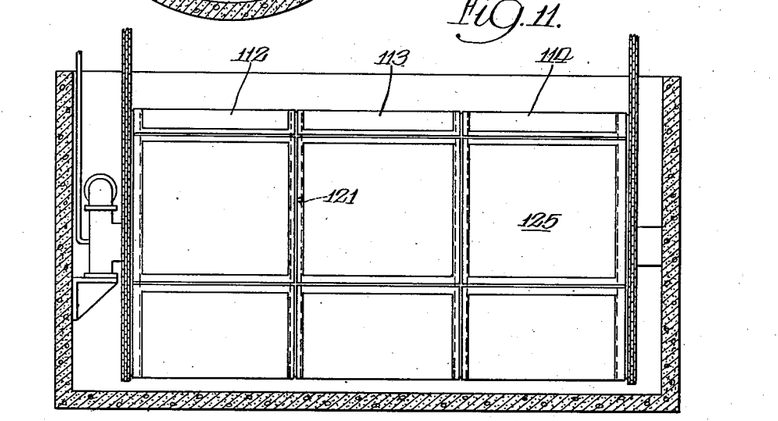
Fig. 11 is a sectional view with the filter in elevation.

In accordance with my invention, the cylindrical screen is made in sections, each section having a small enough arcuate dimension so that the cylinder may be stopped in a position which will leave the entire area of at least one section above the level of the liquid surrounding the filter in the tank. Referring to Figure 10, the double arrow 111 indicates the arcuate limits of the filter sections 112, 113 and 114. These filter sections being above the liquid level 115, it is possible to stop the cylinder in that position and remove any one or all of these filter sections, clean them, or replace them by new or previously cleaned sections, without any danger of any of the unfiltered solution passing into the interior of the cylinder without filtration. By using a simple means for attaching these filter sections or plates to the cylinder, the work of removal and replacement may be performed in a very few minutes, after which the rotation of the filter and all of the usual function of the apparatus may be resumed. However, during the quick replacement of the filter sections the filter will nevertheless continue to function, and the inflow and outflow of liquids need not be interrupted. In large installations a catwalk such as 116 may extend longitudinally over the top of the cylinder across the tank walls on which the operator may stand when changing the filter plates.

Figure 12:
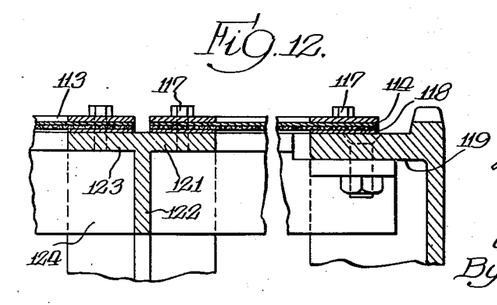
Fig. 12 is an enlarged detail view showing the mode of securing filter sections.
Figure 13:
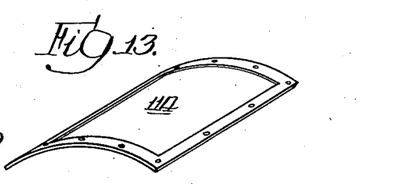
Fig. 13 is a perspective view of a single filter section.

Merely as illustrative of one simple form of securing the sectional plates to the cylinder, I have shown cap screws such as 117 which will hold the margins or frame of a filter plate such as 114 firmly against a gasket 118 made of any suitable material supported at one side on the flange 119 of one end wall and a flange 121 which is formed on a circumferential rib 122. The next adjoining filter section such as 113 will be supported on the flange 123 of the same rib, and it will extend over to the flange of another similar circumferential rib. The circumferential T-shaped ribs 112 may be connected together by longitudinally extending ribs or angle irons 124 whose outer surfaces may be so disposed that the horizontal margins of any two sections such as 114 and 125 will rest thereon, a suitable gasket being disposed between the interior surface of each section and the longitudinally extending rib 124. Thus a tight seal may be provided around all four edges of each filter section.

Accordingly, whether the apparatus of Figures 10 to 13 be used in a filtration or a washing operation, the process may be conducted continuously, the spray systems for dislodging the solids as heretofore explained keeping the filter in a good filtering condition while replacement of filter sections may be accomplished without cessation of the filtering action.

It is contemplated that this sectional filter construction may be used in any of the cylindrical filters shown in the various figures of these drawings. For certain filtration problems one may find it desirable not to use sprays for continuously removing the solids from the filter surface, but may find it more practical merely to remove filter sections at stated intervals and replace them with cleaned sections.

The feed inlet for the apparatus of Fig. 10 may be located at any desirable location, for example, as shown in Fig. 1 for straight filtering, or as shown in Fig. 8 when used with successive washing facilities.

In the various figures in the drawings only a small difference in head is shown between the interior and exterior of the filter, but it is contemplated that this difference may be greatly varied and that the interior liquid level may be even lower than the axis of the cylinder, necessitating the use of a pump, syphon action, or other equivalent means, to evacuate the filtrate.

The speed of rotation of the drum may be varied and controlled in any suitable manner and may be determined by the frequency of cloth washing required. Despite variations, the rate of rotation will, nevertheless, be slow because of the general purpose of gently laying onto the screen a layer of solids which will effect filtration of a high degree of clarification.

Operating control may be exercised through any one or more of the various means available, i. e., inlet pipe, filtrate discharge pipe, sludge outlet pipe, speed of drum rotation, spray wash pressure, or any combination thereof.

It should be understood that the methods and apparatus herein described and shown are selected merely to illustrate the nature of the invention and that many variations in the details of construction and mode of operation may be employed without departing from the spirit and scope of the invention.

Having shown and described my invention, I claim:

1. A separator comprising a tank having a liquid inlet, a rotary screen mounted for horizontal rotation in said tank and partially submerged in the liquid therein, means for rotating said screen, means for washing solids from the surface of said screen as it emerges from the liquid back to the liquid surrounding the same, means for evacuating filtered liquid from the interior of the screen, and means for removing concentrated solids from the bottom of said chamber.

2. A separator comprising a tank having a liquid inlet, sludge removal means adapted for positively propelling sludge along and from the tank bottom, a horizontally rotating filter partially submerged in the liquid in the tank and extending downwardly to a level just above said sludge removal means, means for evacuating filtered liquid from the interior of the filter, and means for washing solids from the surface of the filter as it emerges from the liquid back into the liquid surrounding the filter.

3. A method of washing solids in suspension comprising introducing the same into a liquid suspension in a relatively quiescent chamber having a partially submerged horizontally rotatable filter and delivering the unwashed solids to the chamber area adjoining the submerging side of the filter, effecting a gentle depositing of the solids on the filter surface by use of a slightly lower hydrostatic head inside of the filter, delivering a washing liquid into a plurality of zones below the liquid level of the chamber surrounding the filter progressively spaced between its lines of submergence and emergence for progressively washing solids adhering to the filter surface, filtering the liquid through the solids by drawing the same into the interior of the filter, discharging the filtrate from the filter interior, discharging the washed solids from the filter surface back into the surrounding liquid in the chamber and removing the washed solids directly from the liquid suspension in the chamber.

4. A method of separating suspended solids from a dilute liquid mixture comprising feeding the mixture into a chamber having a horizontally rotating filter partially immersed in the liquid mixture in the chamber, withdrawing clarified liquid from the interior of the filter, dislodging deposited solids from the surface of the filter as it emerges from the liquid and allowing the dislodged solids to fall back into the body of liquid to mingle generally therewith, and withdrawing thickened solids from the bottom of the chamber.

5. A method of washing solids in suspension comprising introducing the same into a liquid suspension in a relatively quiescent chamber having a partially submerged horizontally rotatable filter and delivering the unwashed solids to the chamber area adjoining the submerging side of the filter, delivering a washing liquid into the chamber below the liquid level thereof into a plurality of zones surrounding the filter progressively spaced between its lines of submergence and emergence for progressively washing solids adhering to the filter surface, filtering the liquid through the solids by drawing the liquid into the interior of the filter, discharging the filtrate from the filter interior, discharging the washed solids from the filter surface back into the surrounding liquid and removing the solids from the bottom of the chamber.

6. A separator comprising a tank having a liquid inlet, a horizontally rotating tubular filter partially submerged in the liquid in the tank and extending downwardly to a level just above the tank bottom, the sludge removing means comprising spirally arranged segmental blades disposed on the filter and arranged to substantially contact the tank bottom for propelling sludge along the tank bottom parallel to the axis of the filter, means for evacuating from the tank the sludge propelled by said blades and means for discharging deposited solids from the surface of the filter adjoining the level where the filter emerges from the liquid, said means being adapted to discharge the solids back into the liquid that surrounds the filter.

7. A method of separating suspended solids from a dilute liquid mixture comprising continuously feeding the mixture into a chamber having a horizontally slowly rotating filter almost wholly immersed in the liquid therein, withdrawing clarified liquid from the interior of the filter, effecting the gentle depositing of a layer of solids on the filter by means of a small hydrostatic pressure differential, continuously discharging from the surface of the filter as it rises from the liquid the solids deposited thereon and causing them to reenter and mingle generally with the main body of liquid, maintaining the liquid body in a quiescent state adjoining the cleaned surface of the filter as it descends into the liquid, removing thickened solids from the bottom of the chamber, and maintaining in the chamber surrounding the filter a much more thickened suspension of solids than the original liquid mixture by controlling the inflow and outflow of liquid and the rate of solids withdrawal whereby the solid suspension adjoining the filter itself acts as a fluid filter while the accumulated concentration of solids affords substantial compacting of solids settling toward the bottom of the chamber.

WILLIAM J. DONOHUE.